United States Patent
Gimpel et al.

(10) Patent No.: US 10,509,109 B2
(45) Date of Patent: Dec. 17, 2019

(54) OPTOELECTRONIC SENSOR AND METHOD FOR DETECTING AN OBJECT

(71) Applicant: SICK AG, Waldkirch (DE)

(72) Inventors: Hartmut Gimpel, Waldkirch (DE); Sebastian Tschuch, Waldkirch (DE); Roger Buser, Waldkirch (DE)

(73) Assignee: SICK AG, Waldkirch (DE)

(*) Notice: Subject to any disclaimer, the term of this patent is extended or adjusted under 35 U.S.C. 154(b) by 475 days.

(21) Appl. No.: 15/376,860

(22) Filed: Dec. 13, 2016

(65) Prior Publication Data
US 2017/0168144 A1   Jun. 15, 2017

(30) Foreign Application Priority Data
Dec. 15, 2015   (DE) .......... 10 2015 121 840

(51) Int. Cl.
| | |
|---|---|
| *G01C 3/08* | (2006.01) |
| *G01S 7/481* | (2006.01) |
| *G01S 17/08* | (2006.01) |
| *G01B 11/24* | (2006.01) |

(52) U.S. Cl.
CPC ............ *G01S 7/4816* (2013.01); *G01B 11/24* (2013.01); *G01S 7/4817* (2013.01); *G01S 17/08* (2013.01)

(58) Field of Classification Search
CPC .... G01S 7/4816; G01S 7/4817; G01S 7/4815; G01S 17/08; G01S 17/42; G01S 17/89; G01B 11/24
USPC ........................................................ 356/5.01
See application file for complete search history.

(56) References Cited

U.S. PATENT DOCUMENTS

| | | |
|---|---|---|
| 5,953,110 A | 9/1999 | Burns |
| 6,791,072 B1 | 9/2004 | Prabhu |
| 8,836,922 B1 | 9/2014 | Pennecot et al. |
| 10,203,399 B2 * | 2/2019 | Retterath ............... G01S 17/10 |
| 2008/0290435 A1 | 11/2008 | Oliver et al. |
| 2010/0002313 A1 | 1/2010 | Duparre et al. |
| 2011/0149423 A1 | 6/2011 | Lasfargues et al. |

FOREIGN PATENT DOCUMENTS

| | | |
|---|---|---|
| DE | 197 57 849 B4 | 12/2004 |
| DE | 10 2014 005 521 A1 | 10/2015 |
| EP | 1927867 A1 | 6/2008 |
| JP | 2003336447 A | 11/2003 |
| JP | 2007-94168 A | 4/2007 |

OTHER PUBLICATIONS

Office action issued in corresponding German application No. 10 2015 121 840.2 dated Aug. 11, 2016.

* cited by examiner

*Primary Examiner* — Mark Hellner
(74) *Attorney, Agent, or Firm* — Nath, Goldberg & Meyer; Jerald L. Meyer; Stanley N. Protigal

(57) ABSTRACT

An optoelectronic sensor (10) for detecting an object in a monitoring area (20), the sensor (10) having at least one light transmitter (22) for transmitting a plurality of mutually separated light beams (26), a light receiver (34) with a plurality of light receiving elements (34*a*) for generating a respective reception signal from the remitted light beams (30) remitted by the objects, a receiving optics (32) arranged in front of the light receiver (34) and an evaluation unit (46) for obtaining information about the object from the reception signals, wherein at least some of the light receiving elements (34*a*) have a mutual offset in a direction perpendicular to their receiving surface.

14 Claims, 3 Drawing Sheets

OPTOELECTRONIC SENSOR AND METHOD FOR DETECTING AN OBJECT

FIELD

The invention relates to an optoelectronic sensor and a method for detecting an object in a monitoring area.

BACKGROUND

Many optoelectronic sensors operate according to the scanning principle, in which a light beam is transmitted into the monitoring area and the light beam remitted by objects is received again in order to electronically evaluate the reception signal. The light time of flight is often measured with a known phase or pulse method to determine the distance of the scanned object.

In order to extend the measuring region, on the one hand the scanning beam can be moved, as is done in a laser scanner. There, a light beam generated by a laser periodically scans the monitoring area by means of a deflection unit. In addition to the measured distance information, the angular position of the object is determined from the angular position of the deflection unit so that the position of the object in the monitoring area is detected in two-dimensional polar coordinates.

Another possibility for extending the measuring region is to detect a plurality of measurement points by a plurality of scanning beams. This can also be combined with a laser scanner, which in that case not only scans a monitoring plane, but a three-dimensional spatial area via a plurality of monitoring planes. In most laser scanners, the scanning movement is achieved by a rotary mirror. It is also known in the art, in particular when using a plurality of scanning beams, to rotate the entire measuring head with light transmitters and light receivers instead, as for example described in DE 197 57 849 B4.

In order to evaluate the remitted light of a plurality of scanning beams, the light receiver must be able to detect them individually. For this purpose, a receiving optics is provided in order to focus the scanning beams on defined receiving elements. A simple solution is to form the receiving optics as a single aspherical lens. However, if a plurality of scanning beams are to be detected which are at an angle to one another, a relatively large image field results, and a common single lens has large imaging errors in the off-axial image regions.

This can in principle be solved by each receiving element having its own lens. Then, only a very small image field needs to be imaged which a single lens easily can do. The overall arrangement with a large number of single lenses, however, again is very complex.

It is also known for a long time to use an objective of a plurality of lenses for imaging an extended field of view. Thus, a high imaging quality can be achieved, but the manufacturing and adjustment costs are too high, especially in a laser scanner where the moving mass is to remain as small as possible. What is needed is a solution with possibly only one lens.

Among the known single lenses, the so-called "Wollaston landscape lens" still has the best imaging properties for an extended image field. This is a convex-concave lens, i.e. an inwardly curved meniscus shape, and an aperture arranged with an offset. Such a lens tends to be a good compromise between cheap manufacturing of a single asphere and a high image quality of an objective. In photography, the image points in an imaging field of $\pm 12°$-$\pm 25°$ are imaged with sufficiently small imaging error with f-numbers (quotient of focal length and diameter of the entrance pupil) $k=10\ldots16$. Such large f-numbers, i.e. small apertures, cannot be used in particular for time of flight measurements because too much light is lost. When the aperture is increased, the imaging errors are also increased.

SUMMARY

It is therefore an object of the invention to provide a simple receiving optics with good imaging quality for a sensor.

The object is satisfied by an optoelectronic sensor for detecting an object in a monitoring area, the sensor having at least one light transmitter for transmitting a plurality of mutually separated light beams, a light receiver with a plurality of light receiving elements for generating a respective reception signal from the remitted light beams remitted by the objects, a receiving optics arranged in front of the light receiver, and an evaluation unit for obtaining information about the object from the reception signals, wherein at least some of the light receiving elements have a mutual offset in a direction perpendicular to their receiving surface.

The object is also satisfied by a method for detecting an object in a monitoring area wherein a plurality of mutually separated light beams are transmitted into the monitoring area and the remitted light beams remitted by the object are each received by a respective light receiving element for generating a respective reception signal in order to obtain information about the object from the reception signals, wherein at least some of the light receiving elements have a mutual offset in a direction perpendicular to their receiving surface.

The sensor according to the invention is a multiple scanner which transmits a plurality of transmission light beams from at least one light transmitter. There are thus a plurality of light transmitters, or the light of one light transmitter is split into a plurality of transmitting light beams, or there is a hybrid of both. The transmission light beams are not to be understood as beams within a larger light bundle as in ray optics, but are mutually separable light beams and thus isolated scanning beams, which generate respective separate, mutually offset light spots when impinging on an object in the monitoring area. An associated light receiver has a plurality of light receiving elements and is therefore capable of generating a plurality of reception signals from a plurality of remitted light beams from different directions, i.e. for example by providing one photodiode per transmission light beam, or by forming groups of light receiving elements on a spatially resolving light receiver or of pixels of an imaging sensor. These reception signals are evaluated to obtain information about the object.

The invention starts from the basic idea to arrange common receiving optics for several or even all remitted light beams in front of the light receiver and to gain an additional degree of freedom in the design of the receiving optics in the form of a curved shape of the imaging plane. To this end, a mutual offset in the direction perpendicular to the receiving area is introduced for at least some of the light receiving elements. This direction which sometimes will be referred to as height direction preferably at the same time is the direction towards the receiving optics and coincides with its optical axis. However, the reception path may for example still be folded by mirrors.

The offset may be physical and/or optical. A physical offset means that at least some of the light receiving elements are positioned outside a conventional common plane.

Since the quality of the receiving optics ultimately depends on the light paths and not the physical distances, the offset may also be achieved by an optical element between receiving optics and light receiver, which introduces different virtual distances by pro-longed or shortened light paths for at least some light receiving element.

A mutual offset of the light receiving elements leads to blind spots between the light reception elements. Only individual image regions separated from one another can be recorded, which precludes the use of a light receiver of this type as a conventional image sensor. However, for the detection of a plurality of mutually separated measurement points which are scanned by the plurality of transmission light beams the detection according to the invention is perfectly suitable, because there are anyway unobserved areas between two respective measurement points where it is irrelevant whether the light receiver could in principle detect them.

The invention has the advantage that an additional design degree of freedom is obtained for optimizing the imaging quality so that imaging errors of a receiving optics can further be reduced to an extend which would not be possible without the design degree of freedom, in particular for simple receiving optics. In this way the sensor may make use of simple receiving optics which significantly reduces manufacturing costs for components and adjustment, in particular as compared to a multi-lens objective.

The light receiving elements preferably form an arc with their mutual offset. Even more preferably, the light receiver consists of this arc, i.e. the light receiving elements form a line arrangement which is shaped as the arc in height direction. Throughout this specification, the terms preferably or preferred refer to advantageous, but optional features. The arc obviously is discrete due to the finite extent of the light receiving elements. An arc corresponds to the convex or concave shape of a lens surface and thus provides a similar design degree of freedom.

The receiving optics preferably comprises a lens. This means that the receiving optics is based on refraction. Preferably, there is actually exactly one lens in a particularly cost-effective and easily mountable receiving optics. Alternatives with mirrors, thus receiving optics based on reflection, or with a diffractive optical element are also conceivable.

At least one of an aperture and an additional lens is preferably associated with the lens. The aperture is preferably placed at some distance in front of or behind the lens (landscape lens/rear landscape lens). Thus, with still simple receiving optics, improved imaging properties for larger viewing angles are possible. Several lenses result in a receiving objective. An individually adapted free-form lens is also conceivable, which combines the effects of several of these elements. The invention tries to avoid complex measures like an objective or a free-form lens because of the necessary costs. Nevertheless, they can be combined with the inventive idea of a curved image plane, and it is possible to use comparably simple objectives or free-form lenses whose imaging properties achieve a required quality only after optimizing the offset of the light receiving elements.

Several light receiving elements are preferably arranged on a common circuit board. More preferably, all the light receiving elements are arranged on the common circuit board, or are arranged group-wise on a plurality of common circuit boards. The arrangement on a common circuit board is significantly more cost-effective in its manufacture and electronically advantageous in terms of supply, connection and control of the light transmitters. The light receiving elements do not necessarily have to be directly, but can also by only indirectly arranged on the common circuit board, for example with an intermediate element which provides the mutual offset.

The common circuit board preferably comprises areas of different heights, and the light receiving elements are arranged in the areas. In this embodiment, the circuit board itself has a height structure which may lead to circuit board areas of different thicknesses. The varying height levels on the circuit board preferably correspond to the offset of the light receiving elements.

Preferably a carrier element with areas of different heights is arranged on the common circuit board, wherein the light receiving elements are arranged in the areas. This also leads to a height structure, while it may be simpler in manufacturing to place the carrier element on the circuit board rather than to provide the structure on the circuit board itself. It is also conceivable that height structures of the circuit board and of the carrier element complement each other. Another variant provides several carrier elements for groups of light receiving elements or individual light receiving elements.

A transparent optical element with areas of optical paths of different length is preferably arranged in front of the light receiving elements. This again can be an element with a height structure which in this embodiment does not serve as a carrier, but is arranged in front of the light receiving elements and selectively varies the length of the light paths for at least some light receiving elements. The light receiving elements themselves can be arranged in one plane, but the image plane still is curved due to the different light paths.

Preferably, aperture elements are arranged in front of the light receiving elements at different distances. This is yet another possibility to achieve the offset of the light receiving elements not physically but optically. The aperture elements in their entirety form the curved image area. Light guides can be provided between a respective aperture element and the associated light receiving element in order to prevent loss of light or optical cross-talk in the region between aperture elements and light receiving elements.

The sensor is preferably configured as a laser scanner and has a movable deflection unit for periodically guiding the transmitted light beams through the monitoring area. As explained in the introduction, the laser scanner scans the monitoring area in several planes with the movement of the movable deflecting unit. The deflection unit is preferably configured as a rotatable scanning unit, which virtually forms a movable measurement head, with at least one of the light transmitter and the light receiver possibly including their optics being arranged in the scanning unit.

The evaluation unit is preferably configured to determine a distance of the object from a light time of flight between transmitting the light beams and receiving the remitted light beams. The sensor thus becomes a distance-measuring sensor. As an alternative, only the presence of an object is detected and for example output as a switching signal.

The inventive method can be modified in a similar manner and shows similar advantages. Further advantageous features are described in the sub claims following the independent claims in an exemplary, but non-limiting manner.

BRIEF DESCRIPTION OF THE DRAWINGS

The invention will be explained in the following also with respect to further advantages and features with reference to exemplary embodiments and the enclosed drawing. The Figures of the drawing show in.

DETAILED DESCRIPTION

Figure 1:
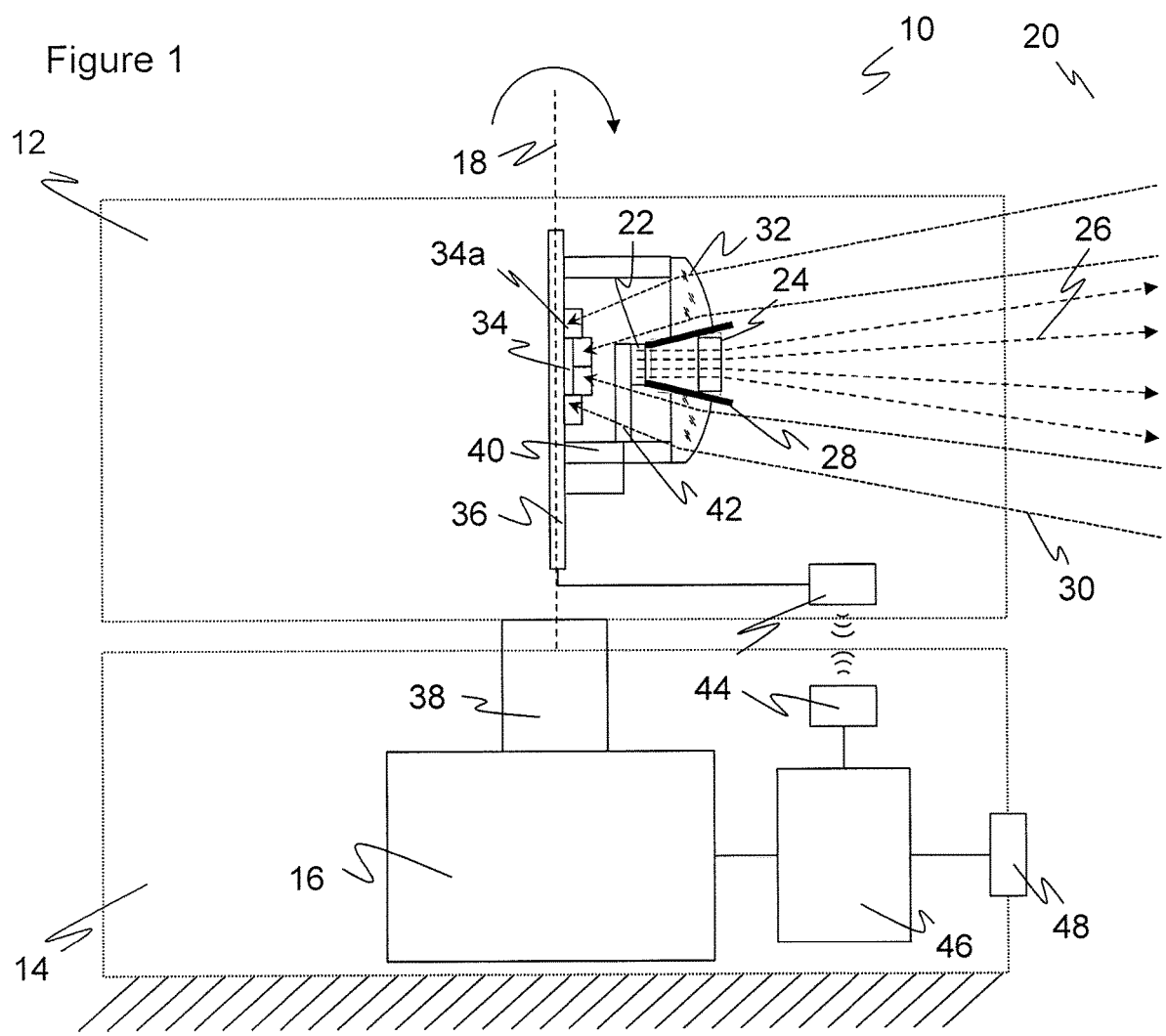
FIG. 1 a schematic sectional view of an optoelectronic sensor configured as a laser scanner.

FIG. 1 shows a schematic sectional view through an optoelectronic sensor 10 in an embodiment as a laser scanner. The sensor 10 comprises in a first overview a movable scanning unit 12 and a base unit 14. The scanning unit 12 is the optical measuring head, while further elements such as a supply, evaluation electronics, connections and the like are accommodated in the base unit 14. In operation, the scanning unit 12 is set into a rotary movement about a rotational axis 18 by a drive 16 of the base unit 14 so as to periodically scan a monitoring area 20.

In the scanning unit 12, a light transmission unit 22 for example having LEDs or lasers in the form of edge emitters or VCSELs generates by means of transmission optics 24 only shown as a function block a plurality of transmission light beams 26 with mutual angular offset, which are transmitted into the monitoring area 20. In order to avoid stray light within the sensor 10, the internal light paths of the transmission light beams 26 may be shielded by an opaque tube 28.

When the transmission light beams 26 impinge on an object in the monitoring area 20, corresponding remitted light beams 30 return to the sensor 10. The remitted light beams 30 are guided by receiving optics 32 onto a light receiver 34. The light receiver 34 comprises a plurality of light receiving elements 34a and is therefore capable of generating a separate electric reception signal from each respective remitted light beam 30. For this purpose, several photodiodes or APDs (avalanche photodiode) are conceivable, but also an image sensor with correspondingly assigned individual pixels or pixel groups. A further possible embodiment provides a SPAD (single-photon avalanche photodiode) receiver with a plurality of SPADs. They have a relatively large receiving surface and are therefore well adapted to a beam divergence that may be increased compared to single beam sensors.

The light receiving elements 34a are mutually offset in a direction referred to as height direction which is perpendicular to their receiving surface, i.e. a horizontal direction in the representation of FIG. 1. This offset can be physical as shown, but can also be achieved by optical means. Several exemplary embodiments are explained below with reference to FIGS. 4 to 8.

In this embodiment, the light receiver 34 is arranged on a circuit board 36, which is located on the axis of rotation 18 and is connected to the shaft 38 of the drive 16. The receiving optics 32 is supported on the circuit board 36 by means of legs 40 and supports a further circuit board 42 of the light transmitter unit 22. The two circuit boards 36, 42 are connected to one another and can also be designed as a common Flexprint circuit board.

The optical arrangement shown in FIG. 1 with two superimposed circuit boards 36, 42 or circuit board regions and transmission optics 24 arranged in the center of receiving optics 32 is purely exemplary. Alternatively, any other arrangement known per se, for example from one-dimensional optoelectronic sensors or laser scanners, is also possible, such as a double-eye arrangement or the use of a deflection or beam splitter mirror. It is also conceivable to mount the light transmitter unit 22 and the light receiver 34 on a common circuit board, which may in an arrangement different from FIG. 1 also be a common circuit board in only one plane.

A contactless supply and data interface 44 connects the movable scanning unit 12 to the stationary base unit 14. A control and evaluation unit 46 is provided in the base unit 14, which can alternatively be at least partly be accommodated on the circuit board 36 or at any other location in the scanning unit 12. The control and evaluation unit 46 controls the light transmitter unit 22 and receives the reception signal from the light receiver 34 for further evaluation. It also controls the drive 16 and receives the signal from an angle measuring unit, which is not shown and generally known from laser scanners and determines the respective angular position of the scanning unit 12.

In the evaluation, preferably the distance to a scanned object is measured by a light time of flight method which is known per se. In combination with the information about the angular position from the angle measuring unit, two-dimensional polar coordinates of all object points in a scanning plane are available with angle and distance after each scanning period. The respective scanning plane is also known via the identity of the respective remitted light beam 30 and its detection location on the light receiver 34, so that all in all a three-dimensional spatial area is scanned.

The object positions and object contours, respectively, are thus known and can be output at a sensor interface 48. The sensor interface 48 or another connection which is not shown can be used in the other direction as a parameterization interface. The sensor 10 can also be designed as a safety sensor for use in safety technology for monitoring a source of danger, such as a dangerous machine. In this case, a protection field is monitored which must not be entered by personnel during operation of the machine. When the sensor 10 detects an unauthorized violation of the protection field, such as a leg of an operator, it triggers an emergency stop of the machine. Sensors 10 used in safety technology have to be particularly reliable and therefore must meet high safety requirements, for example the EN13849 standard for machine safety and the EN61496 device standard for non-contact protective devices (ESPE). In particular, the sensor interface 48 can then be designed as a safe output interface (OSSD, output signal switching device) in order to output a safe switch-off signal upon a protection field violation by an object.

The illustrated sensor 10 is a laser scanner with a rotating measuring head, namely the scanning unit 12. Alternatively, periodic deflection by means of rotary mirrors is also conceivable. In the case of a plurality of transmission light beams 26, however, this has the disadvantage that the arrangement of the plurality of transmission light beams 26 in the monitoring area 20 depends on the respective rotational position because the arrangement rotates with the rotary mirror, as known geometrical considerations show. A further alternative embodiment pivots the scanning unit 12 either instead of the rotary movement, or additionally about a second axis perpendicular to the rotary movement in order to generate a scanning movement also in elevation.

The embodiment as a laser scanner is also exemplary. One-dimensional sensors without periodic movement are also possible, which in essence consist of a stationary scanning unit 12 with corresponding electronics, but without the base unit 14.

During the rotation of the sensor 10, a surface is scanned by each of the transmission light beams 26. Only for a deflection angle of 0°, i.e. in FIG. 1 a horizontal transmission light beam which there is absent, a plane of the monitoring area 20 is scanned. The other transmission light beams scan the surface of a cone whose aperture depends on the deflection angle. For a plurality of transmission light beams 26 which are deflected upwards or downwards at different angles, the overall scanning area is a kind of nesting of several hourglasses. These surfaces are sometimes also referred to simply as scanning planes.

Figure 2:
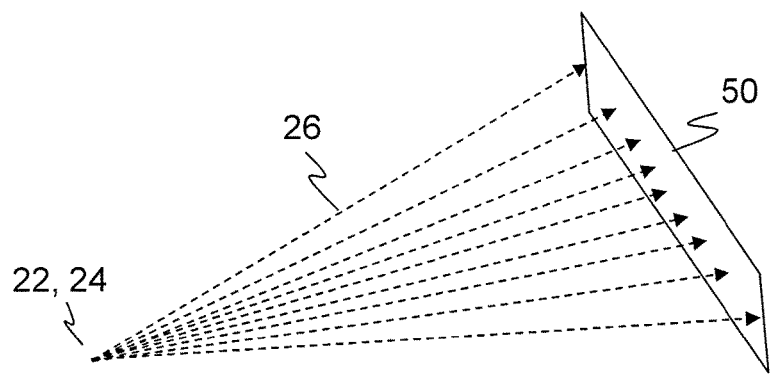
FIG. 2 an exemplary illustration of a plurality of scanning beams as used by a sensor according to FIG. 1.

FIG. 2 again illustrates the plurality of scanning light beams 26 forming a planar fan and having a same angular distance from one another. In a vertical sectional plane 50, the cross sections of the transmission light beams 26 form a regular linear arrangement of measurement points. A regular fan as shown in FIG. 2 is a preferred practical example, but the invention is not limited to this arrangement of transmission light beams 26.

In order to detect the plurality of remitted light beams 30 from different angular directions, the receiving optical system 32 has to cover a relatively large image area. There is therefore a discrepancy between the desire to have simple receiving optics 32 and sufficient imaging quality. If possible, only a single lens is to be used as receiving optics 32. A preferred starting point in this case is the "landscape lens" already mentioned in the introduction, i.e. a meniscus lens with an offset aperture. Such a lens provides the following design degrees of freedom: The focal length f, the f-number F#, the position of the aperture, usually placed in the natural aperture position with minimal coma, the material, the center thickness and the radii of curvature. Of course, for example a different lens without aperture or an objective with a plurality of lenses can also be the starting point, with corresponding variation in the design degrees of freedom and the costs.

Now, according to the invention, the image plane, i.e. the plane with the light receiving elements 34a, is effectively curved. This results in a further design freedom degree, which is used to obtain an improved imaging performance. The curvature of the imaging plane can be achieved by various means which either change the physical position of the light receiving elements 34a or their effective position by optical elements arranged in front of the light receiving elements 34a, or by a combination of both.

Figure 3:
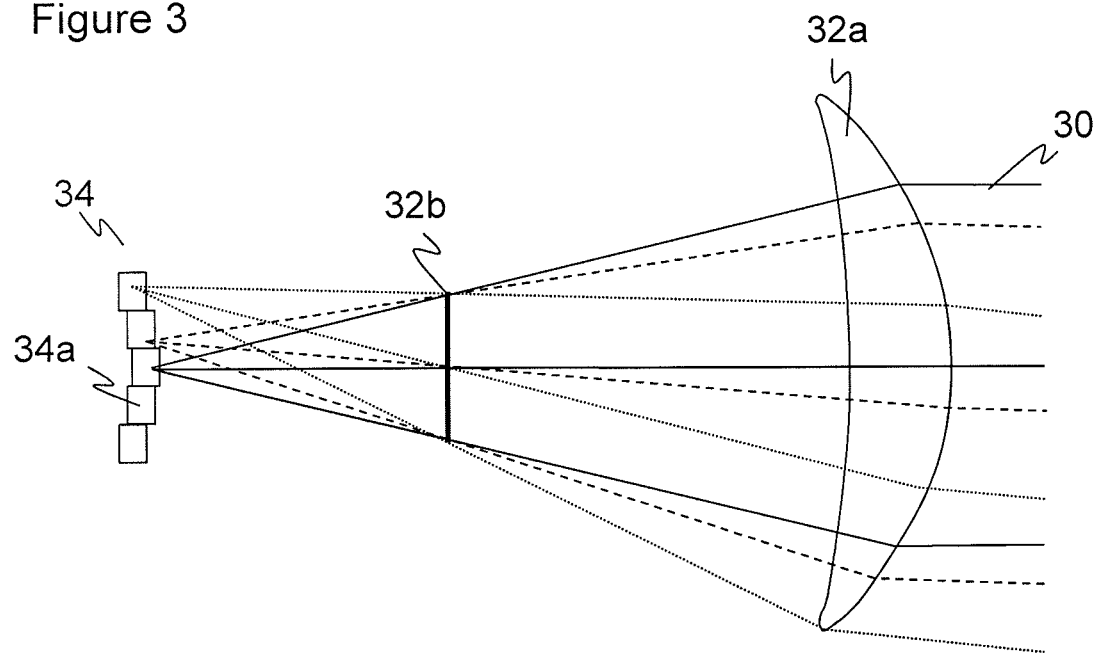
FIG. 3 a schematic representation of the reception beam path at light receiving elements with mutual offset.

FIG. 3 shows an exemplary reception path of the remitted light beams 30 at receiving optics 32 formed as a meniscus-shaped lens 32a with an aperture 32b arranged at some distance. In this example, the light receiving elements 34a form a convex arc, as far as this is possible with discrete light receiving elements 34a of finite size. The respective offset of the light receiving elements 34a is the additional design freedom factor mentioned several times and is therefore purely exemplary. In practice, the actual offsets are optimized together with the properties of the receiving optics 32. The example of FIG. 3 illustrates that the light beams 30 are not focused on a common plane as a result of the imaging errors of simple receiving optics 32 which cannot be perfectly optimized. This disadvantageous effect is at least partially compensated by suitable offsets of the light receiving elements 34a, so that the individual remitted light beams 30 are imaged in focus or at least in better focus. As a numerical example, which approximately corresponds to the representation of FIG. 3, the receiving optics 32 with an f-number k=2, an image field of ±6° or alternatively ±9°, and a focal length f=80 still generates image points having a geometrical diameter <100 μm.

Various technical implementations for achieving the effectively curved image plane by physical or optical offset of the light receiving elements 34a will now be presented with reference to FIGS. 4 to 8. In practice, usually only one of these variants is selected, but this does not exclude forming combinations, with the offsets superimposing accordingly.

Figure 4:
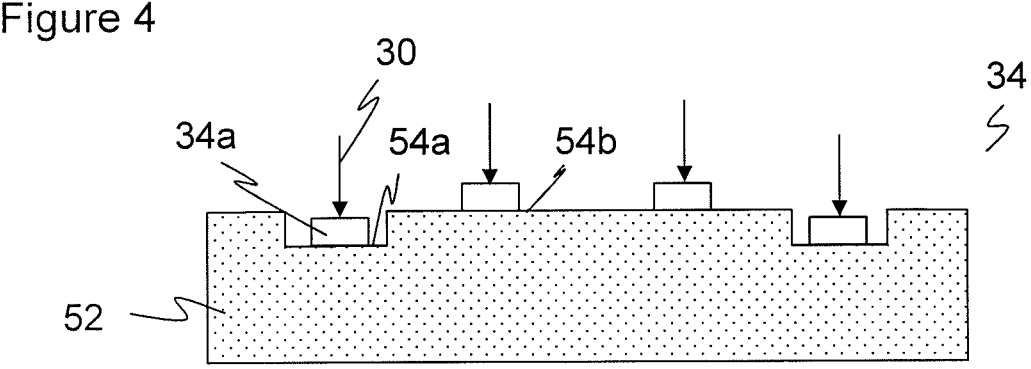
FIG. 4 an embodiment of a light receiver with mutual offset of the light receiving elements by height structuring of a circuit board.

FIG. 4 shows an embodiment of the light receiver 34 with the light receiving elements 34a being arranged on a circuit board 52 having a height structure. The circuit board 52 of the light receiver 34 explained here and below may be the circuit board 36 of FIG. 1, but here bears its own reference symbol of a separate circuit board which is connected to the circuit board 36 or is arranged thereon.

Due to the height structuring of the circuit board 52, areas 54a b are formed with mutual height offset where the light receiving elements 34a are placed and are therefore no longer on one level, but are offset relative to one another. The circuit board 52 may have a different thickness in these areas 54a-b.

Figure 5:
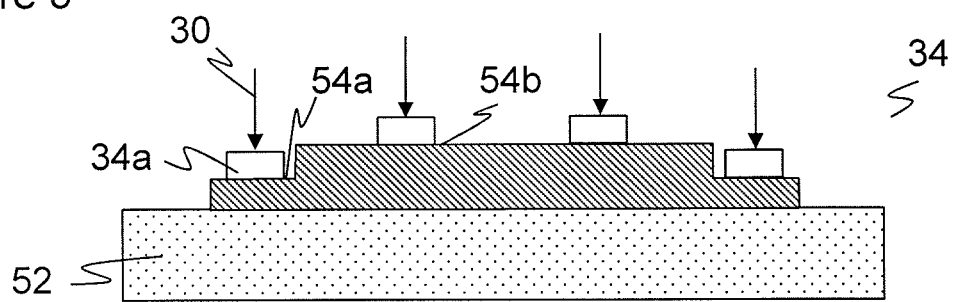
FIG. 5 a further embodiment of a light receiver with mutual offset of the light receiving elements by a carrier element with height structuring.

FIG. 5 shows a further embodiment of the light receiver 34. Here, the circuit board 52 itself can remain flat. The offset is achieved by a carrier element 56 with a height structure arranged on the circuit board 52. The areas 54a-b with mutual height offset are therefore not provided on the circuit board 52 itself but on the carrier element 56. The advantage of this arrangement is that the circuit board 52 does not need to be structured or formed. It may facilitate manufacture to structure the carrier member 56 separately and then arrange it on the circuit board 52.

Figure 6:
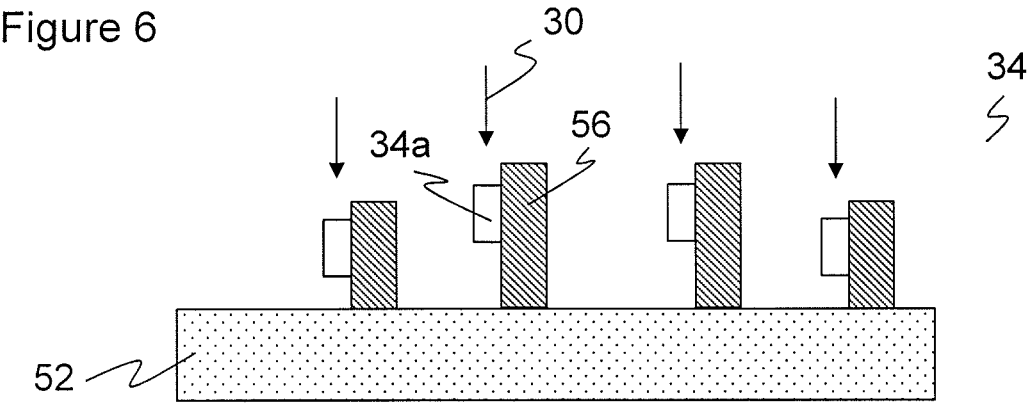
FIG. 6 a further embodiment of a light receiver with mutual offset of the light receiving elements by individual carrier elements.

FIG. 6 shows a further embodiment of the light receiver 34 with a circuit board 52 which can in itself be flat. Several small circuit boards 56 of differing thickness or height are arranged thereon, which in turn each carry a light receiving element 34a or, differing from the illustration, a group of light receiving elements 34a at different heights. As a variant, it is conceivable that the small circuit boards 56 penetrate the circuit board 52 with differing depth or to arrange the respective light receiving element 34a at different heights on the small circuit board 56. In particular, in that case small circuit boards 56 with mutually identical geometry and other configuration can be used.

Figure 7:
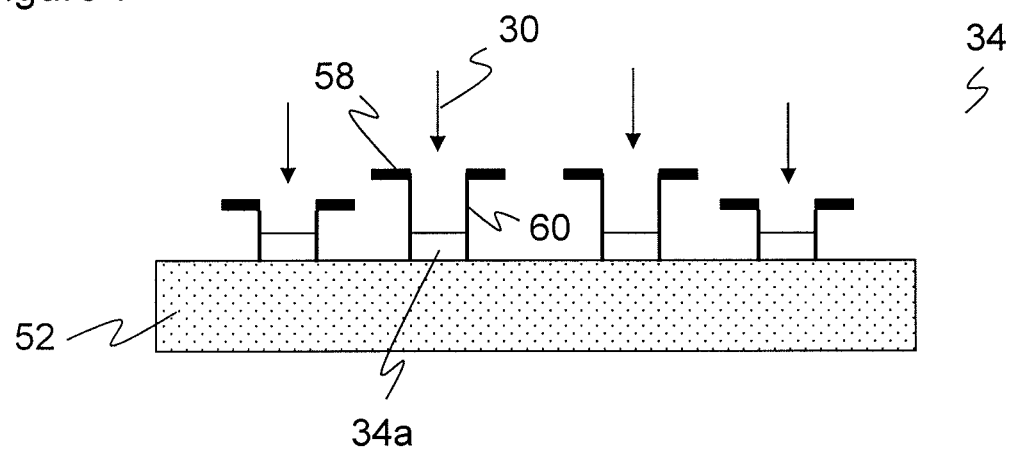
FIG. 7 a further embodiment of a light receiver with mutual offset of the light receiving elements by arranging aperture elements with height offset.
Figure 8:
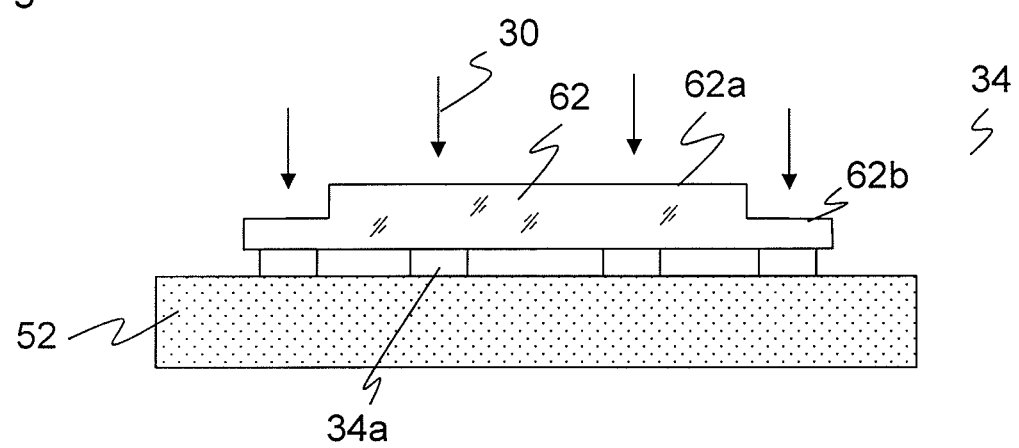
FIG. 8 a further embodiment of a light receiver with mutual offset of the light receiving elements by arranging an optical element with height structuring.

While the embodiments according to FIGS. 4 to 6 lead to a physical height offset of the light receiving elements 34a, two embodiments with effective or optical height offset are now to be presented with reference to FIGS. 7 and 8.

FIG. 7 shows a further embodiment of the light receiver 34 in which the light receiving elements 34a are physically arranged on one level on the circuit board 52. The curved image plane is achieved by a plurality of additional aperture elements 58 each having different height offset relative to the associated light receiving element 34a. The overall arrangement of the aperture elements 58 forms a curved surface because of the individual height offsets.

Additional light guide elements 60 can also be provided between the aperture elements 58 and the light receiving elements 34a so that the light of the remitted light beams 30 is guided without light losses or optical cross-talk from the aperture element 58 to the light receiving element 34a. This can be, for example, be tubes with an inside mirror coating which are optically closed at both ends.

FIG. 8 shows a further embodiment of the light receiver 34 with light receiving elements 34a which are arranged on one level on the circuit board 52. Here, an optical element 62 is arranged in front of the light receiving elements 34a which individually changes the effective length of the light path and thus provides for the height offsets. In the illustrated example, the optical element 62 is a transparent, step-shaped component which has a different effective thickness in different areas 62a-b for the respective light-receiving elements 34a.

In the explanations with reference to FIGS. 4 to 8 it is referred to an individual offset, which is not meant to exclude the possibility that the offset is the same for several light receiving elements 34a, as also can be seen in the representations. The offset is a design degree of freedom and initially not limited, not even by the demand for differences.

The receiving surfaces of the light receiving elements 34a are aligned parallel to one another in the illustrations. This could be varied in other embodiments, for example by tilting them to orient them approximately perpendicular to the expected direction of incidence of the respective associated remitted light beam 30. Furthermore, an additional lateral offset of the light receiving elements 34a is possible, which would then no longer form a regular arrangement. Such adaptations can further improve the imaging quality of the receiving optics 32.

The invention describes an additional design degree of freedom for receiving optics 32 by height offset of the light receiving elements 34a. Following the same basic idea, an additional design degree of freedom can also arise for the transmission optics 24, in particular when it is configured as a common single lens or a lens with an aperture arranged in front of the light transmitters of the light transmitter unit 22. Embodiments in analogy with FIGS. 4 to 8 are conceivable in this context, where the respective light receiving elements 34a are replaced by individual light transmitters, where it should be noted that some embodiments like for example the one of FIG. 7 using aperture elements 58 are less useful on the transmitter side than on the receiver side.

The invention claimed is:

1. An optoelectronic sensor (10) for detecting an object in a monitoring area (20), the sensor (10) having at least one light transmitter (22) for transmitting a plurality of mutually separated light beams (26), a light receiver (34) with a plurality of light receiving elements (34a) for generating a respective reception signal from the remitted light beams (30) remitted by the objects, a receiving optics (32) arranged in front of the light receiver (34), and an evaluation unit (46) for obtaining information about the object from the reception signals, wherein at least some of the light receiving elements (34a) have a mutual offset in a direction perpendicular to their receiving surface, the mutual offset is achieved by at least one of the following measures:
several light receiving elements arranged on a common circuit board, the common circuit board comprising areas of different heights, with the light receiving elements being arranged in the areas;
several light receiving elements arranged on a common circuit board, a carrier element with areas of different heights being arranged on the common circuit board and the light receiving elements being arranged in the areas;
a transparent optical element with areas of optical paths of different length arranged in front of the light receiving elements, the optical element provided as a transparent, step-shaped component having different effective thickness in different areas for the respective light-receiving elements; and
aperture elements arranged in front of the light receiving elements at different distances.

2. The sensor according to claim 1, wherein the light receiving elements (34a) form an arc with their mutual offset.

3. The sensor according to claim 1, wherein the receiving optics (32) comprises a lens (32a).

4. The sensor according to claim 3, wherein at least one of an aperture (32b) and an additional lens is associated with the lens (32a).

5. The sensor according to claim 1, which is configured as a laser scanner and has a movable deflection unit (12) for periodically guiding the transmitted light beams (26) through the monitoring area (20).

6. The sensor according to claim 5, wherein the deflection unit (12) is configured as a rotatable scanning unit with at least one of the light transmitter (22) and the light receiver (34) being arranged in the scanning unit.

7. The sensor according to claim 1, wherein the evaluation unit (46) is configured to determine a distance of the object from a light time of flight between transmitting the light beams and receiving the remitted light beams.

8. A method for detecting an object in a monitoring area (20), wherein a plurality of mutually separated light beams (26) are transmitted into the monitoring area (20) and the remitted light beams (30) remitted by the object are each received by a respective light receiving element (34a) for generating a respective reception signal in order to obtain information about the object from the reception signals,
wherein at least some of the light receiving elements (34a) have a mutual offset in a direction perpendicular to their receiving surface,
and wherein the mutual offset is achieved by at least one of the following measures:
several light receiving elements are arranged on a common circuit board, the common circuit board comprising areas of different heights, with the light receiving elements being arranged in the areas;
several light receiving elements are arranged on a common circuit board, a carrier element with areas of different heights being arranged on the common circuit board and the light receiving elements being arranged in the areas;
a transparent optical element with areas of optical paths of different length is arranged in front of the light receiving elements, the optical element being a transparent, step-shaped component having different effective thickness in different areas for the respective light-receiving elements; and
aperture elements are arranged in front of the light receiving elements at different distances.

9. An optoelectronic sensor (10) for detecting an object in a monitoring area (20), the sensor (10) having at least one light transmitter (22) for transmitting a plurality of mutually separated light beams (26), a light receiver (34) with a plurality of light receiving elements (34a) for generating a respective reception signal from the remitted light beams (30) remitted by the objects, receiving optics (32) arranged in front of the light receiver (34), and an evaluation unit (46) for obtaining information about the object from the reception signals, wherein at least some of the light receiving elements (34a) have a mutual offset in a direction perpendicular to their receiving surface, characterized in that the mutual offset is achieved by at least one of the following measures:

several light receiving elements (34a) are arranged on a common circuit board (36, 52) which due to a height structuring of the circuit board itself with circuit board regions of varying thickness comprises areas (54a-b) of different heights or which is equipped with a carrier element (56) with areas (54a-b) of different heights, wherein the light receiving elements (34a) are arranged in the areas (54a-b).

10. The sensor according to claim 9,
wherein the light receiving elements (34a) form an arc with their mutual offset.

11. The sensor according to claim 9,
wherein the receiving optics (32) comprises a lens (32a).

12. The sensor according to claim 11,
wherein at least one of an aperture (32b) and an additional lens is associated with the lens (32a).

13. The sensor according to claim 9,
which is configured as a laser scanner and has a movable deflection unit (12) for periodically guiding the transmitted light beams (26) through the monitoring area (20), wherein in particular the deflection unit (12) is configured as a rotatable scanning unit with the light transmitter (22) and/or the light receiver (34) being arranged therein.

14. The sensor according to claim 9,
wherein the evaluation unit (46) is configured to determine a distance of the object from a light time of flight between transmitting the light beams and receiving the remitted light beams.

* * * * *